No. 623,831. Patented Apr. 25, 1899.
C. W. A. ROMER.
LOCK.
(Application filed Apr. 18, 1898.)
(No Model.) 4 Sheets—Sheet 1.

WITNESSES:
A. R. Krausse
Russell M. Everett

INVENTOR:
Charles W. A. Romer,
BY Drake & G.
ATTORNEYS

THE NORRIS PETERS CO., PHOTO-LITHO., WASHINGTON, D. C.

No. 623,831. Patented Apr. 25, 1899.
C. W. A. ROMER.
LOCK.
(Application filed Apr. 18, 1898.)
(No Model.) 4 Sheets—Sheet 2.

WITNESSES:
A. R. Krausse
Russell M. Everett

INVENTOR
Charles W. A. Romer
BY Drake & G.
ATTORNEYS.

No. 623,831.  
C. W. A. ROMER.  
LOCK.  
(Application filed Apr. 18, 1898.)  
(No Model.) 4 Sheets—Sheet 3.
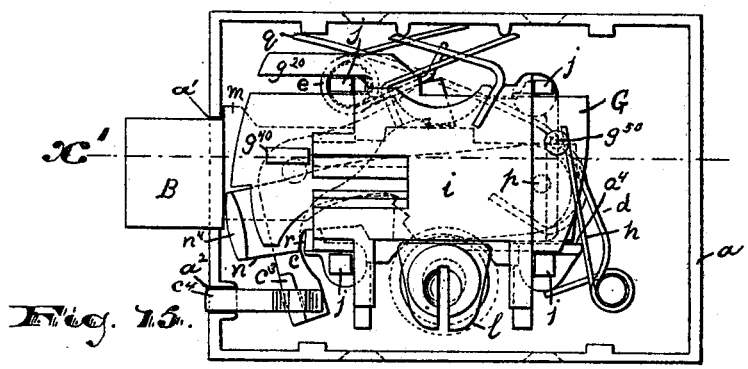
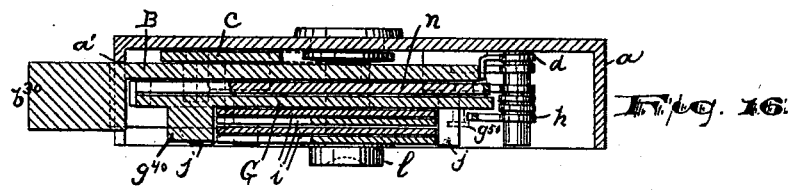
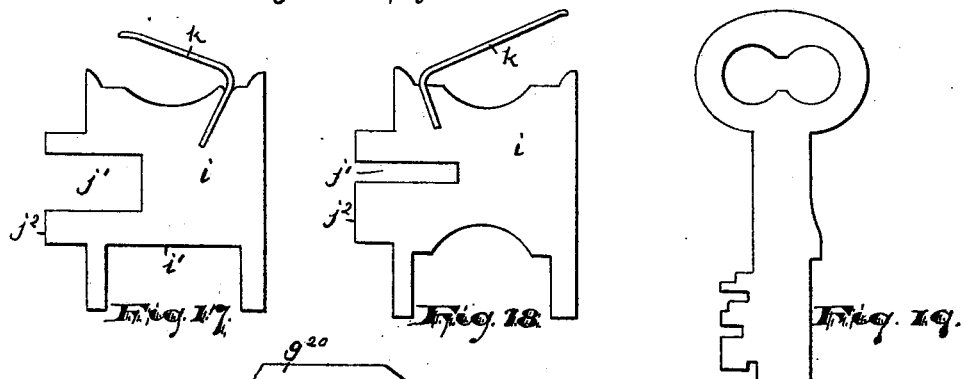
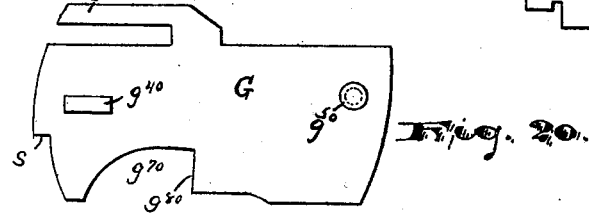
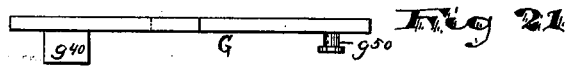
WITNESSES:  
INVENTOR:  
Charles W. A. Romer,  
BY  
ATTORNEYS.

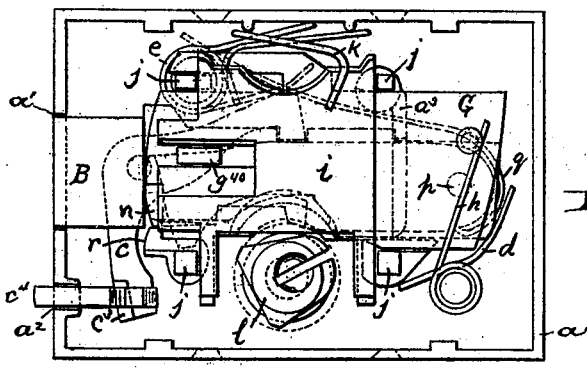

UNITED STATES PATENT OFFICE.

CHARLES W. A. ROMER, OF NEWARK, NEW JERSEY.

LOCK.

SPECIFICATION forming part of Letters Patent No. 623,831, dated April 25, 1899.

Application filed April 18, 1898. Serial No. 677,918. (No model.)

*To all whom it may concern:*

Be it known that I, CHARLES W. A. ROMER, a citizen of the United States, residing at Newark, in the county of Essex and State of New Jersey, have invented certain new and useful Improvements in Locks; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain improvements in that class of locks adapted to be applied more particularly to sliding doors, although the said lock may be employed in connection with swinging doors, and in which the locks lock automatically when the said doors are brought together at their meeting edges, the objects of the invention being to obtain greater security in the locking, to increase the durability of the lock, and to secure other advantages and results, some of which may be referred to hereinafter in connection with the description of the working parts.

The invention consists in the improved lock and in the arrangements and combinations of parts of the same, all substantially as will be hereinafter set forth, and finally embraced in the clauses of the claim.

Figure 1:
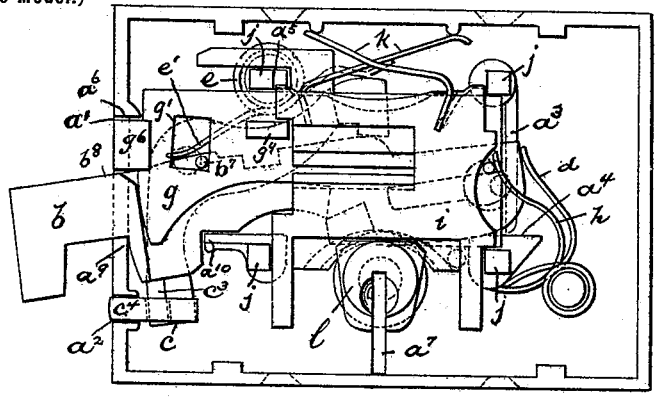
Figure 2:
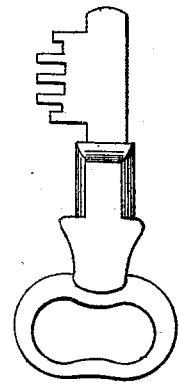
Figure 2:
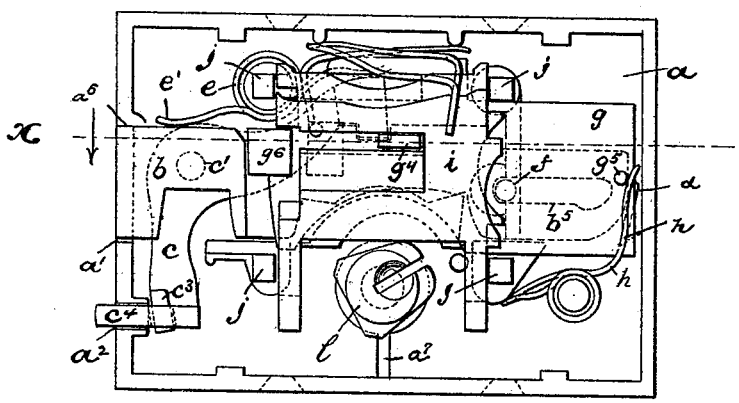
Figure 3:
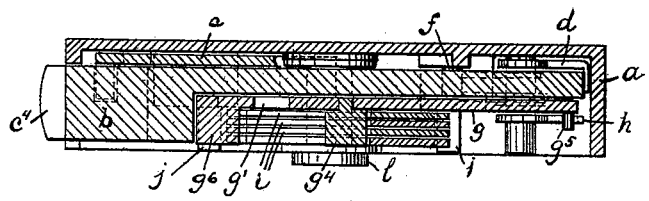
Figure 5:
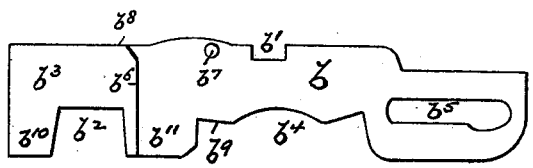
Figure 6:
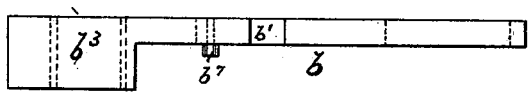
Figure 7:
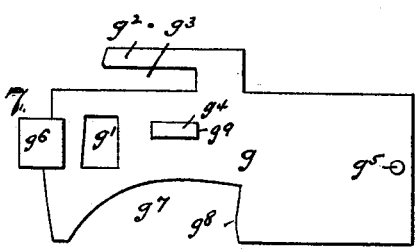
Figure 9:
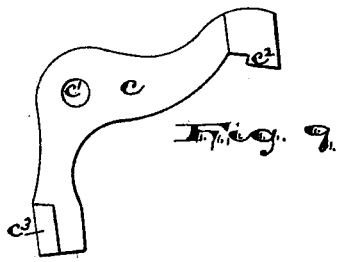
Figure 8:
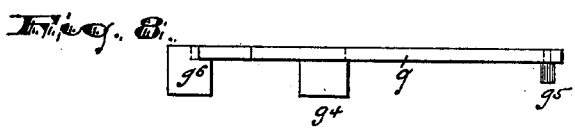
Figure 10:
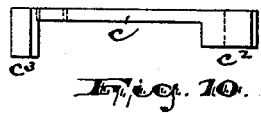
Figure 11:
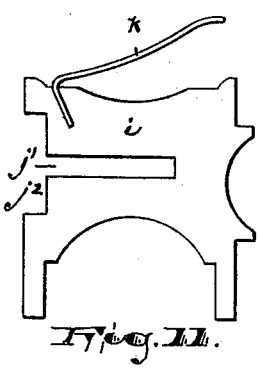
Figure 12:
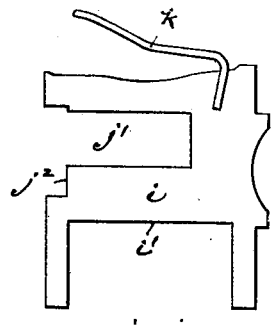
Figure 13:
Figure 14:

Referring to the accompanying drawings, in which like letters of reference indicate corresponding parts in each of the several views, Figure 1 is a plan of my improved lock, one of the side plates therefor being removed to show the working parts more clearly and the lock-bolt being extended to its locking position. Fig. 2 is a similar plan with the lock-bolt withdrawn. Fig. 3 is a sectional view taken at line $x$, Fig. 2. Fig. 4 is a plan of a key adapted to be employed with the lock with which it is illustrated. Figs. 5 and 6 are respectively a plan and edge view of the lock-bolt in detail. Figs. 7 and 8 are respectively a plan and edge view of a safety-stay adapted to be employed in holding the said lock-bolt in its locked position. Figs. 9 and 10 are respectively a plan and edge view of an automatic bolt-releasing device. Figs. 11 and 12 are plans of certain tumblers adapted to be acted upon by the key in the locking operation, and Figs. 13 and 14 are respectively a plan and edge view of a certain repression-piece forming a part of the bolt-releasing device. The foregoing views show the parts as applied to a construction sometimes preferred. Fig. 15 is a plan showing modifications of construction, the interior locking mechanisms being shown in their locked positions. Fig. 16 is a section of the same, taken on line $x'$. Figs. 17 and 18 are detail plans of tumblers employed in said modified construction. Fig. 19 is a plan of the key employed in this form of lock, it being understood, of course, that the form of the key may be varied to suit variations in the details of the locking mechanisms. Figs. 20 and 21 are respectively a plan and edge view of a certain slide, the purpose of which will be described hereinafter more fully. Fig. 22 is a plan of the lock, showing the locking mechanisms in their unlocked positions. Figs. 23 and 24 are respectively a plan and edge view of a locking-bolt. Figs. 25 and 26 are respectively a plan and an edge view of a bolt-releasing device. Figs. 27 and 28 are respectively a plan and an edge view of a modified form of safety-stay. Figs. 29 and 30 are respectively a plan and an edge view of the repression-piece, and Figs. 31 and 32 are respectively a plan and a side view of an improved key guide or journal which is slotted to receive the key and to turn in the lock with said key to bring the key into proper relation to the tumblers.

While I have shown only one modification of construction, it is obvious that various other modifications may be employed without departing from the spirit or scope of my invention, and I do not wish to be understood as limiting myself to the exact construction shown in the drawings or to the positive descriptive terms hereinafter to be employed by me in the specification and claims, excepting as the state of the art may require.

In describing my invention I will first refer to the preferred construction and afterward direct my description to the variation.

In carrying out the invention in the preferred form I first form a lock-case $a$, which in general construction is similar to those heretofore commonly employed. Within said lock-case, preferably in one integral casting therewith, are various protuberances or conformations which serve as slideways, pivotal bearings, and the like for the working parts. These may be of any ordinary construction and may be modified to suit any changes made to meet various conditions.

At the forward end of the lock-case I form a slot or opening $a'$ for the lock-bolt $b$, and beneath said slot or opening I form a second opening $a^2$, adapted to receive a repression-piece $c^4$, the said repression-piece in assembling the lock in this construction being first arranged in position. Next a bolt-releasing device $c$ is placed in the case $a$. Said bolt-releasing device $c$ comprises a lever-like piece, as shown in detail in Figs. 9 and 10, being bent in semblance to a bell-crank and being provided with a perforation or other fulcrumal means $c'$ at the angle therein by which it is pivoted on the lock-casing. At its inner end the said bolt-releasing device is provided with a pawl-tooth $c^2$, adapted to enter a recess $b'$ in the lock-bolt when the said lock-bolt is pressed back to its unlocked position. The opposite end of the said bolt-releasing device extends to a point closely adjacent to the opening $a^2$ in the lock-case and is thereat provided with a lateral projection $c^3$, onto which the repression-piece $c^4$ of the bolt-releasing device is fitted, the said repression-piece being provided at its lower edge with a recess $c^5$, Fig. 13, adapted to receive the said lateral projection $c^3$, so that when said repression-piece is pressed back in its slideway or bearings it will cause the said lever to turn on its fulcrum $c'$ and throw the pawl $c^2$ out of engagement with the lock-bolt, the said lock-bolt being thus released, so that a spring $d$ will be free to throw said lock-bolt to its locking position.

In connection with the bolt-releasing device $c$ I employ a spring $e$, Figs. 1 and 2, one function of which is to throw the pawl-tooth end of the bolt-releasing device into locking relation to the lock-bolt. Another function of the said spring will be hereinafter described. Between the lateral projections $c^2$ $c^3$ of the releasing device is arranged the lock-bolt $b$. Said bolt slides longitudinally between bearings $a^3$ $a^4$, the said bearings being sufficiently apart to not only permit the said longitudinal movement, but also to permit a limited pivotal movement, the said pivotal movement occurring when the lock-bolt is thrown to its outer locking position. Said lock-bolt, near its forward end, is recessed at the lower edge, as at $b^2$, giving to the said bolt, where it is adapted to project from the case, a hooked shape. At said projecting part $b^3$ the lock-bolt is of considerable thickness, completely filling the opening $a'$ laterally. Back from the said end $b^3$ the said bolt is considerably reduced in thickness, and at its lower edge said bolt is recessed, as at $b^4$, the irregular walls of said recess providing bearings for various purposes, hereinafter more fully described. At its inner or rearward end the latch-bolt is longitudinally slotted, as at $b^5$, and receives a stud $f$, formed on or attached to the lock-case. The lock-bolt slides on said pin longitudinally, and when said bolt has arrived at its outer limit of movement and is free to turn pivotally, as hereinafter described, the said stud serves as the pivot on which said lock-bolt moves. At a point between the shoulder $b^6$, formed by the lateral enlargement of the outer part $b^3$ and the recess or notch $b'$ for the pawl-tooth, I have formed or fixed a lateral projecting pintle $b^7$. (Shown more clearly in Figs. 5 and 6.) This is adapted to lie in a recess or opening $g'$ of a safety-stay $g$, as shown in Fig. 7, the said pintle being no greater in length than the thickness of the said safety-stay, so as not to interfere with the superimposed tumblers hereinafter described. The pintle serves when unlocking the device to permit an independent movement of the safety-stay and locking-bolt under certain conditions.

The lock-bolt being in position, as described, I arrange at one side thereof the safety-stay $g$. (Shown in detail in Figs. 7 and 8.) Said safety-stay involves one of the important elements of my improvements and is adapted to securely hold the latch-bolt in its locked position when said lock-bolt is thrust by the spring forward to its locked position, whereby all outside manipulation by unauthorized persons will be futile to unlock the device, the said safety-stay positively preventing the repression of the lock-bolt by manipulation of the projecting end of said lock-bolt. Said safety-stay in the construction now being described consists of a metal plate suitably arranged in bearings or slideways to permit a straight longitudinal movement thereof, the upper edge of said plate being provided, preferably, with a hook-shaped conformation $g^2$, forming a longitudinal slot $g^3$ between itself and the body of the plate to receive the stud $a^5$ on the lock-case. The said stud $a^5$, in connection with the longitudinal slot $g^3$, while permitting the straight longitudinal movement, prevents any vertical or lateral movement of the said safety-stay. At one side of said safety-stay the same is provided with a fixed stud $g^4$, adapted to receive the tumblers, and at the rear or inner extremity it is provided with a pin $g^5$ to receive a spring $h$, said spring being adapted to automatically throw the safety-stay forward or outward into its staying or locking position. At its forward extremity the said safety-stay is provided with a protuberance $g^6$ of about the lateral width of the opening $a'$ and adapted to enter said opening when the said lock-bolt, having been thrust forward and downward, permits an entrance of said protuberance into the said opening $a'$. It will be evident upon inspection of Fig. 1 that when said lock-bolt works pivotally downward it will leave an aperture of considerable depth between the upper face or edge $b^8$ of said bolt and the upper wall or bearing $a^6$ of the opening $a'$ in the lock-case. The protuberance $g^6$, fitting into said opening between the bearings $a^6$ and $b^8$, will positively prevent any upward movement of the said lock-bolt, and inasmuch as said protuberance does not project outward beyond the end of the lock-case it cannot be manipulated by any implements inserted from the outside of the door between the edge of said door and the door jamb or casing or the lock-strike therein. I thus prevent with great safety any improper manipulation of the lock and obtain the increased security desired.

The under edge of the safety-stay is recessed at $g^7$, forming a key-bearing $g^8$, against which the key impinges in the unlocking operation. Because of the stud $g^4$ at the side of the safety-stay engaging the tumblers hereinafter described the safety-stay cannot be withdrawn from the aperture between the lock-bolt and the wall or bearing $a^6$ of the lock-case until the said tumblers are first operated by the key and brought to the desired position, permitting of the longitudinal movement of the said safety-stay.

The tumblers $i$ may be of any suitable construction, either pivotal or sliding. In the present construction the said tumblers slide vertically on suitable bearings or studs $j\ j\ j\ j$, the said tumblers being slotted, as at $j'$, to permit of the longitudinal movement of the safety-stay and its lateral stud $g^4$, it being understood that the bearings $j^2$ at the forward edges of the tumblers engage the rearward edge $g^9$ of the said safety-stay stud $g^4$ until the key, working on the tumblers, brings the slot $j'$ of the said tumblers into coincidence with the said stud $g^4$, when the said safety-stay will be permitted to enter said slots $j'$, impelled by the key pressing on said safety-stay at the bearing $g^8$. Suitable springs $k\ k$, attached to the tumblers and pressing upon suitable bearings of the lock-case $a$, serve to normally throw the said tumblers to their locked positions.

The upper or outermost tumbler (shown in Fig. 12) differs somewhat from the other tumblers in not being operated directly by the key, but by certain protuberances or bearings formed on the key guide or journal, as shown in Figs. 1 and 2. The key guide or journal $l$, Figs. 1, 2, 31, and 32, is provided at its opposite extremities with pivotal bearings $l'\ l'$, adapted to fit nicely within round openings in opposite sides of the lock-case, and back from said pivotal extremities is provided with flanges $l^2\ l^3$, which engage the inside walls of the said lock-case, and thus prevent any longitudinal movement of the said key-guide. One of said flanges—the one marked $l^3$—is of irregular outline, as shown in Fig. 31, and provides a straight edge bearing $l^4$ at right angles to the key-slot, adapted to lie against the straight edge $i'$ of the outside tumbler $i$, Fig. 12. The said tumbler $i$ thus presses upon the straight bearing $l^4$ of the key-guide with a resilient pressure and tends to hold the longitudinal key-slot $l^5$ into coincidence with the key-aperture $a^7$ of the lock-case, and thus when an attempt is made to unlock the door, the key-guide will be found in its position of coincidence, so that no time is lost or trouble occasioned in feeling for the keyhole or in bringing the slot of the guide into the said coincidence prior to inserting the key. When the key is inserted and turned, with its guide, the cam projections of the irregularly-formed flange $l^3$ press on the edge of the outermost tumbler $i$, causing the said tumbler to slide in its bearings. The resiliency and power of the spring $k$ serve to hold the said key-guide from turning pivotally out of the desired coincidence of the key-slots when the key is withdrawn, as will be understood.

In operating the device thus described, the key-guide being in the desired coincidence with the key-opening $a^7$ of the lock-case, the said key is inserted and the key-guide turned therewith until the edge of the key-bit is brought into coincidence with the lower edge of the tumblers. These said tumblers are then raised by a further turning of the key until the slots $j'$ are brought into coincidence with the stud $g^4$. At this moment the key will be brought into contact with the bearing $g^8$ of the said safety-stay, and as a result the said stay will be caused to slide backward against the power of the spring $h$ to withdraw the protuberance $g^6$ from the aperture $a'$. When this is accomplished and the said protuberance $g^6$ is free from said aperture, the key then engages the bearing $b^9$ at the lower edge of the bolt $b$, and the said bolt is raised, moving pivotally upon the pivot $f$, so that the downwardly-extending tongue $b^{10}$ is released from the inside face of the lock-strike, and the bolt becomes free to move inward on its slideways or bearings. The inward sliding action is occasioned by means of the continued movement of the key pressing on the bearing $g^8$, causing the safety-stay to move inward, and the said safety-stay in turn causes a backward movement of the lock-bolt because of the pin $b^7$ engaging the forward wall of the opening $g'$. The opening $g'$, it may be observed, permits of a limited pivotal movement of the lock-bolt; but the parts are of such form and proportions that when the bolt is in position to be moved backward the said pintle $b^7$ is in engagement with the forward wall of the opening $g'$, as above indicated. Continued turning of the key therefore causes the lock-bolt to be repressed until the outward extremity is brought flush with the outward extremity of the lock-case, at which time the pawl-tooth $c^2$ drops under the pressure of the spring $e$ and enters the recess or notch $b'$, thus holding said lock-bolt in its repressed or inward position. As the pawl-tooth drops into said notch $b'$ to hold the bolt the repression-piece $c^4$ of the bolt-releasing device is forced outward, so as to project beyond the end face of the lock-case, as shown in Fig. 2. Said repression-piece is thus placed in readiness to be pressed back automatically when the sliding doors are brought together or when the swinging door brings the said repression-piece into engagement with the door-strike. When the said door is closed, as above described, and the said repression-piece is pressed back by engagement with said strike, it is evident that the lever-like bolt-releasing device $c$ will be turned on its fulcrum $c'$ and the pawl-tooth $c^2$ raised from holding relation to the bolt, and the latter, under the impulse given to it by the spring $d$, will move forward on its slideways until said slideways or bearings permit the said lock-bolt to be turned pivotally, when the arm $e'$ of the spring $e$, pressing upon the upper edge of said lock-bolt $b^3$, forces said lock-bolt pivotally downward, causing an opening at the top part of the slot $a'$ to receive the protuberances $g^6$ and the entrance of a stay projection $b^{11}$ of said bolt between the inside wall $a^9$ and the abutting bearing $a^{10}$ of one of the studs $j$ of the lock-case. When the lock-bolt drops automatically, as above described, to its lower position, the safety-catch, impelled by the spring $h$, is forced forward and the protuberance $g^6$ thereon enters the opening $a'$, preventing an upward movement of said bolt. The tumblers also automatically drop to their position to receive the key preliminary to unlocking, all as will be clearly understood.

The construction shown in Figs. 15 to 22, while operating in a somewhat different manner from that above described in detail, accomplishes a very similar result in locking the sliding bolt, and the parts are of the same construction with the exception of the locking-bolt and safety-stay. In this case the sliding bolt B is not intended to move pivotally and is not, therefore, particularly applicable to sliding doors, and the safety-stay $n$ instead of being a sliding device is pivotal, as will be understood upon examination of Fig. 27. A slide G is added to coöperate with the safety-stay. The locking-bolt B has its outer end $b^{30}$ preferably rectangular in shape, and at the upper edge is a stop $m$, adapted to engage the wall of the lock-case $a$, adjacent to the opening $a'$, and limit the outward movement of the bolt. In the upper edge of the bolt is a recess $b^{100}$ to receive the pawl $c^2$ on the bolt-releasing device, and the lower edge is suitably recessed, as at $b^{40}$, to form a key-bearing. Near the inner end of the bolt a pin $p$ projects from the side of the bolt, upon which pin the safety-stay $n$ is pivoted. Said safety-stay is shown having fulcrumal means at its inward end to receive said pin $p$, and is provided with a spring $q$, normally tending to throw said safety-stay to its lower or locking position. The said safety-stay when withdrawn from its locking position is adapted to slide longitudinally with the locking-bolt under the power exerted by the key. Said safety-stay $n$ is recessed at its lower edge, as at $n'$, forming a head $n^2$ at the extremity, and when the stay is in its lower or locking position this head $n^2$ lies between the thick outer end of the locking-bolt and a stop projection $r$ on the lock-case. The extremity of the stay engages the shoulder $b^{60}$ of the bolt, and the side $n^3$ of the recess $n'$ in the lower edge of the stay engages said stop projection $r$, whereby the withdrawal of the bolt is prevented until the safety-stay is raised, as will be understood. To prevent the said raising of the safety-stay by any other means than the key the slide G is provided. Said slide is arranged to be moved longitudinally in precisely the same manner as the safety-stay $g$ described in connection with the preferred construction of my lock, and to that end has the corresponding arm $g^{20}$, projection $g^{40}$, pin $g^{50}$, recess $g^{70}$, and bearing $g^{80}$. The said slide G lies parallel and adjacent to the safety-stay $n$ and at its forward end has a shoulder $s$, which when the parts are in locked positions overlies a lateral projection $n^4$ on the safety-stay. In the operation of unlocking the key draws back the slide G, raises the safety-stay $n$, and slides the lock-bolt B successively, all other parts operating exactly as in the detailed description already given.

As before indicated, other modifications may be employed within the range of my invention.

Having thus described the invention, what I claim as new is—

1. The combination in a lock, of a lock-bolt, a repression-piece, a bell-crank lever engaging at one end said repression-piece and at the other end said lock-bolt, and springs, substantially as set forth.

2. In a lock, the combination with a lock-bolt, of a repression-piece, a lever engaging at one end said repression-piece and at the other end having a pawl-tooth adapted to hold the lock-bolt in unlocked position, a safety-stay for holding the bolt in locked position, and springs for operating said parts automatically upon pressure of the repression-piece, substantially as set forth.

3. The combination with the lock-case of the longitudinally-movable and pivotal bolt $b$, having the hooked outer end, of a safety-stay adapted to be forced between the bolt and a portion of the lock-case after said bolt has been forced longitudinally and pivotally to its locked position and means for operating said bolt and stay, substantially as set forth.

4. The combination with the lock-case, of the longitudinally-movable pivotal bolt $b$, having the hooked outer end, and a sliding safety-stay and means for operating said sliding stay to lock said bolt, substantially as set forth.

5. The improved lock in which is combined a lock-case having at one end a lock-bolt opening and an independent opening for a repressing-piece, of key-tumblers, a pivotal and longitudinally-sliding lock-bolt, a safety-stay adapted to enter the lock-bolt opening and prevent the withdrawal of said bolt, a repression-piece and connections for holding said lock-bolt, and springs, all arranged and combined substantially as set forth.

6. The improved lock in which is combined a lock-case having interiorly a pivotal pin or stud $f$, and a stud $a^5$, and having a lock-bolt opening $a'$ and an independent opening $a^2$, for a repression-piece $c^4$, a bolt-releasing device comprising said repression-piece $c^4$, and a lever-like piece $c$, in connection with said repression-piece and operated thereby and having a pawl-tooth $c^2$, adapted to enter a recess $b'$, of the lock-bolt, a spring $e$, engaging said bolt-releasing device, a sliding lock-bolt $b$, recessed at its forward end as at $b^2$, and slotted longitudinally at its inner or rearward end to receive the pivotal stud $f$, and having a lateral pintle $b^7$, a sliding safety-stay $g$, having a recess or opening $g'$, to receive said pintle and having a longitudinal slot to receive the stud $a^5$, springs for the lock-bolt and safety-stay, tumblers, and springs for the same and a pivotal key guide or journal, all arranged and adapted to operate substantially as set forth.

7. The improved lock in which is combined a lock-case, a sliding lock-bolt, a repression-piece, a lever-like piece having a pawl-tooth for holding the lock-bolt unlocked, a safety-stay adapted to be forced between the locked bolt and a portion of the lock-case after said bolt has attained its locked position, key-tumblers and springs, all arranged and adapted to operate, substantially as set forth.

8. The combination with the lock-case having a key-aperture, of a sliding lock-bolt, a repression-piece, a lever-like piece operated by said repression-piece and having a pawl or detent-tooth to engage the bolt, a safety-stay, key-tumblers, a slotted pivotal key-guide having at one end a flange $l^3$, of irregular outline with an edge bearing $l^4$, adapted to engage one of said tumblers, the said tumbler being adapted to hold the slot of said key-guide in coincidence with said aperture, and springs, all arranged and adapted to operate substantially as set forth.

9. The combination with the lock-case, having a key-aperture, of a sliding lock-bolt, a repression-piece, a piece having a pawl-tooth to engage the bolt and operated by said repression-piece, a safety-stay, key-tumblers, a slotted pivotal key-guide having at one end an irregular flange $l^3$, with an edge bearing formed at right angles to the key-slot and adapted to engage one of said tumblers, and springs, all arranged and combined substantially as set forth.

10. In a lock, the combination with a tumbler, of a key-guide having a flange engaging the tumbler, said flange being adapted to hold the key-guide in position to receive the key, substantially as set forth.

11. The combination with a lock-case having a key-aperture, of a pivotal key-guide having a flange with an edge bearing, a tumbler normally engaging said edge bearing and holding the key-guide in coincidence with the key-aperture, and springs, substantially as set forth.

In testimony that I claim the foregoing I have hereunto set my hand this 26th day of March, 1898.

CHARLES W. A. ROMER.

Witnesses:
JOSEPH H. WOOLASTON,
CHARLES H. PELL.